United States Patent [19]
Coe et al.

[11] Patent Number: 5,789,668
[45] Date of Patent: Aug. 4, 1998

[54] APPARATUS AND RELATED METHODS FOR OBTAINING TIRE PROFILES INCLUDING THE TREAD AND BOTH SIDEWALLS

[75] Inventors: Scott J. Coe, Akron, Ohio; Paul B. Wilson, Murfreesboro, Tenn.; Vladimir Roth, Akron, Ohio

[73] Assignee: Bridgestone/Firestone, Inc., Akron, Ohio

[21] Appl. No.: 689,858

[22] Filed: Aug. 15, 1996

[51] Int. Cl.[6] .................................................. G01M 17/02
[52] U.S. Cl. .................................................................. 73/146
[58] Field of Search ................................................... 73/146

[56] References Cited

U.S. PATENT DOCUMENTS

| | | | |
|---|---|---|---|
| 3,895,518 | 7/1975 | Leblond | 73/146 |
| 4,783,992 | 11/1988 | Ishibashi | 73/146 |
| 5,245,867 | 9/1993 | Sube et al. | 73/146 |
| 5,309,965 | 5/1994 | Williams | 152/209 R |

OTHER PUBLICATIONS

Wolf & Beck Advertisement Obtained Upon Request From Wolf & Beck, Dated Mar. 17, 1993.

*Primary Examiner*—George M. Dombroske
*Assistant Examiner*—Joseph L. Felber
*Attorney, Agent, or Firm*—Carmen S. Santa Maria

[57] ABSTRACT

A method and apparatus for generating various tire profiles. A linear-linear-rotary table carries a non-contacting probe that sequentially scans the entire outer surface of a tire. The non-contacting probe collects measurement data which is transferred to a processor to generate an average cross-sectional tire profile or a high definition cross-sectional tire profile of the tire being measured. The processor, in conjunction with the non-contacting probe, provides an automatic ranging feature which eliminates the need to manually adjust the non-contacting probe prior to the collection of measurement data.

17 Claims, 3 Drawing Sheets

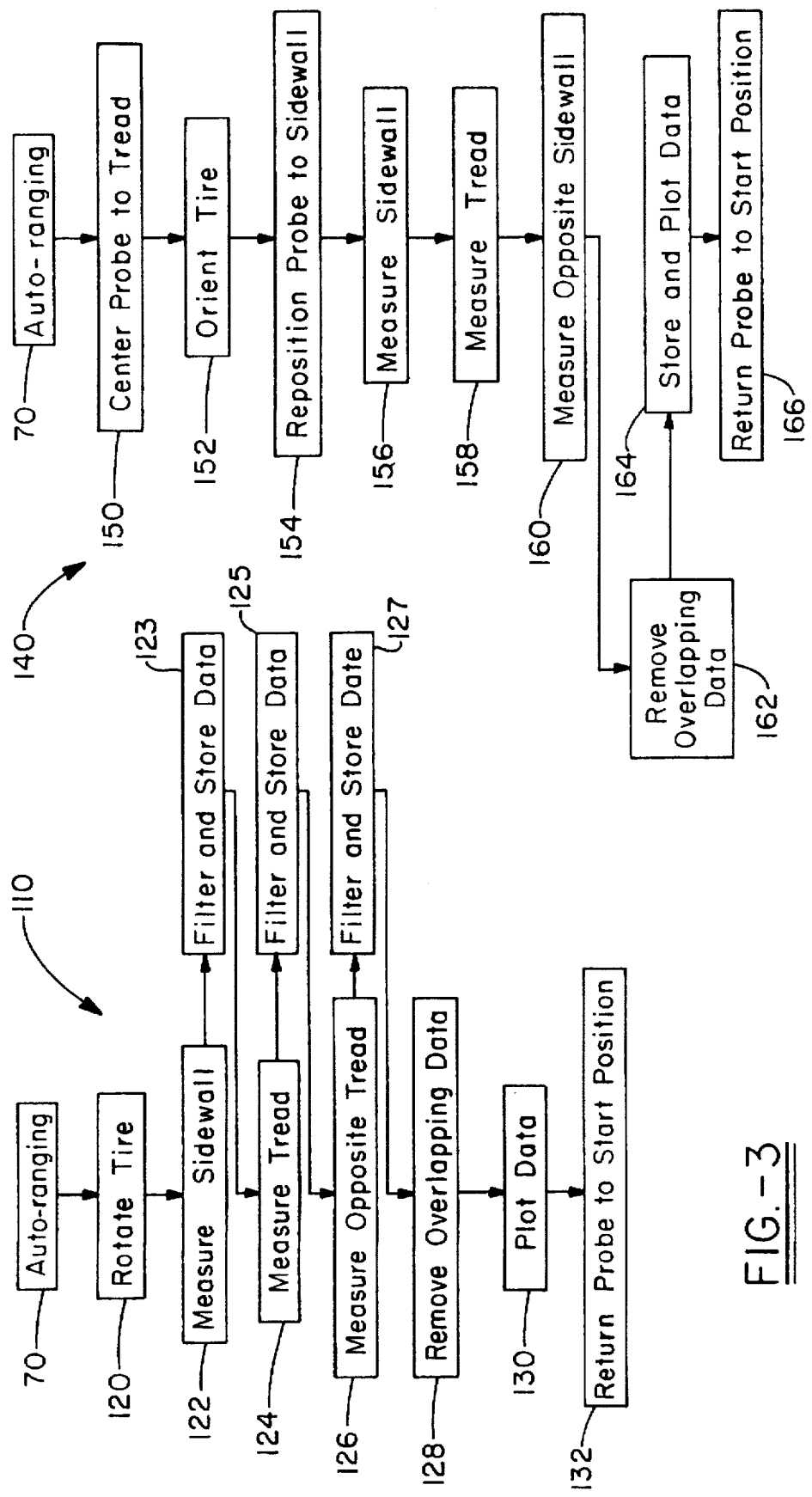

APPARATUS AND RELATED METHODS FOR OBTAINING TIRE PROFILES INCLUDING THE TREAD AND BOTH SIDEWALLS

TECHNICAL FIELD

The invention herein resides in the art of apparatus and techniques for measuring and analyzing various parameters of a pneumatic tire. More particularly, the present invention relates to an apparatus and technique which employs a non-contacting probe that is able to measure an inner sidewall, a tread, and an outer sidewall of the tire by employing a linear-linear-rotary table to position the non-contacting probe without realigning the probe for each surface to be measured. Specifically, the present invention relates to such an apparatus and technique where an automatic ranging function positions the non-contacting probe prior to the collection of measurement data.

BACKGROUND ART

It is currently known to employ non-contacting probes to measure the dimensions of an object. In the case of pneumatic tires, it is known to employ non-contacting probes to measure tread depth, tire periphery and tire run-out. Various techniques have been employed to obtain the aforementioned measurements.

In particular, U.S. Pat. No. 5,245,867 entitled "Method and Apparatus for Measuring Tire Parameters" discloses measuring tread wear incurred by a tire. In particular, a laser probe sequentially scans each of the ribs of a tire to obtain data respecting the tread depth at various points thereon. By manually re-positioning the laser probe, similar data can be obtained regarding the sidewalls of a tire. This data is employed to determine irregular wear of the tread and to determine a total wear index indicative of the degree of wear.

U.S. Pat. No. 5,249,460, entitled "Method and Apparatus for Measuring Irregular Tread Wear," also discloses techniques for measuring and analyzing the tread wear of a pneumatic tire. As the tire is indexed about its axis, a laser scanner obtains data from the tread surface. This data is filtered and normalized to eliminate any out-of-roundness of the tire data. This data is then employed to establish the degree of irregular wear at a given point on the tire.

Although the methods and apparatuses disclosed by the aforementioned patents are effective in their stated purpose, the methods and accuracy of the data which is obtained is considered inefficient and incomplete. In particular, it will be appreciated that the non-contacting probes or lasers must be manually positioned with respect to the outer surface of the tire to optimize the collection of data. In other words, prior to the initiation of the measurement sequence, the non-contacting probe must be manually positioned so that it does not interfere with the rotation of the tire as the tire is measured. Conversely, the non-contacting probe must not be positioned so far from the tire surface as to be ineffective. Moreover, it will be appreciated that the non-contacting probe must be manually repositioned each time a different portion of the tire surface is to be measured. As such, each time the probe is repositioned, the manual process of realigning the probe must be undertaken. Moreover, none of the known methods or devices for measuring a tire provides an average cross-sectional profile nor a high definition profile.

Based upon the foregoing, there is a need in the art for a non-contacting probe which has its movement controlled by a processor, thus allowing measurement of the entire outer surface of a tire. Moreover, there is a need in the art for a non-contacting probe which automatically positions itself to optimize the measurement process. Additionally, there is a need in the art for a measuring device which can generate an average cross-sectional profile of a rotated tire and a high definition cross-sectional profile of a stationary tire.

DISCLOSURE OF INVENTION

It is a first aspect of the present invention to provide a method and apparatus for generating a profile of a tire.

Still another aspect of the present invention is to provide a processor control system which orients the position of a non-contacting probe with respect to the tire.

Another aspect of the present invention, as set forth above, is to provide a processor which adjusts the position of the non-contacting probe to optimize the measurement process.

Yet a further aspect of the present invention, as set forth above, is to provide a linear-linear-rotary table which carries the non-contacting probe, wherein the table adjusts the position of the probe to measure the outer surface of a tire which includes an inner sidewall, a tread and an outer sidewall.

An additional aspect of the present invention, as set forth above, is to measure and store dimensional data obtained by the non-contacting probe, wherein the data is employed to generate an average cross-sectional profile of the entire circumference of a pneumatic tire while the tire is rotating.

Still a further aspect of the present invention, as set forth above, is to provide a non-contacting probe which measures and stores data and wherein the data is employed to generate a high definition two-dimensional cross-sectional profile of a pneumatic tire while the tire is stationary.

Another aspect of the present invention, as set forth above, is to store data collected by the non-contacting probe in the processor for later analysis and comparison.

Yet another aspect of the present invention, as set forth above, is achieved by an apparatus for measuring an average cross-sectional profile of a tire which has an outer surface, comprising: means for determining the circumferential position of a tire about a tire axis of rotation; means for moving a non-contacting probe in juxtaposition to the outer surface of the tire, the non-contacting probe collecting dimensional data of the tire outer surface as the tire rotates; and means for processing data retrieved by the non-contacting probe and the determining means, the processing means correlating the meridial position of the tire with the position of the non-contacting probe to generate an average circumferential measurement of the tire at a given meridial position, the processing means moving the non-contacting probe a predetermined increment along the meridian of the tire and repeating the measurement process and the processing means generating an average cross-sectional profile by using the average circumferential measurements determined at each meridial position.

Still another aspect of the present invention, as set forth above, is achieved by an apparatus for measuring a high-definition cross-sectional profile of a tire which has an outer surface, comprising: means for determining the circumferential position of a tire about a tire axis of rotation; means for moving a non-contacting probe in juxtaposition to the outer surface of the tire, the non-contacting probe collecting dimensional data of the tire outer surface as the tire is held stationary; and means for processing data retrieved by the non-contacting probe and the determining means, the processing means correlating the meridial position of the tire with the position of the non-contacting probe to generate a single measurement of the tire at a given meridial and circumferential position, the processing means moving the non-contacting probe a pre-determined increment along the meridian of the tire and repeating the measurement process and the processing means generating a high definition cross-sectional profile by assembling the individual measurements determined at each meridial and circumferential position.

The foregoing and other aspects of the invention which shall become apparent as the detailed description proceeds are achieved by an apparatus for obtaining a profile of a tire outer surface, comprising: means for determining the rotational position of a tire about a tire axis of rotation, the tire having an outer surface; means for moving a non-contacting probe in juxtaposition to the outer surface of the tire, the non-contacting probe collecting dimensional data of the tire outer surface; and means for processing data retrieved by the non-contacting probe and the determining mechanism, the processing mechanism correlating the rotational position of the tire with the position of the non-contacting probe to generate a profile of the outer surface.

Other aspects of the invention are attained by a method for obtaining a profile of a tire, comprising the steps of: mounting a tire upon an axle, the tire having an outer surface; positioning a non-contacting probe in juxtaposition to the outer surface; ranging the non-contacting probe to optimize the measurement of the outer surface; and measuring the outer surface of the tire with the non-contacting probe to generate a plurality of data points which correlate to a profile of the outer surface.

Yet another aspect of the invention is attained by an apparatus for generating a tire profile, comprising: a first linear table movable in a first direction; a second linear table movable in relation to the first linear table in a second direction orthogonal to the first direction; a third table being rotatable in the plane defined by the first and second directions determined by the first and second tables; a support column extending from the first linear table, the support column rotatably supporting an axle on which a tire is mounted, the tire having an inner sidewall, a tread and an outer sidewall; a non-contacting probe carried by the rotary table, the non-contacting probe measuring the inner sidewall, the tread and the outer sidewall; an encoder connected to and monitoring the rotation of the axle; and a processor interconnected with said non-contacting probe to control the positioning of the non-contacting probe and to collect measurements of the non-contacting probe with respect to the rotational position of the tire as monitored by the encoder, the measurements being employed to generate a tire profile.

BRIEF DESCRIPTION OF THE DRAWINGS

For a complete understanding of the objects, techniques and structure of the invention reference should be made to following detailed description and accompanying drawings wherein:

FIG. 3 is flow chart diagram employed by the apparatus of FIG. 1 and comprising the method of generating an average cross-sectional profile of a tire; and FIG. 4 is a flow chart diagram employed by the apparatus of FIG. 1 and comprising the method of generating a high definition cross-sectional profile of a tire.

BEST MODE FOR CARRYING OUT THE INVENTION

Figure 1:
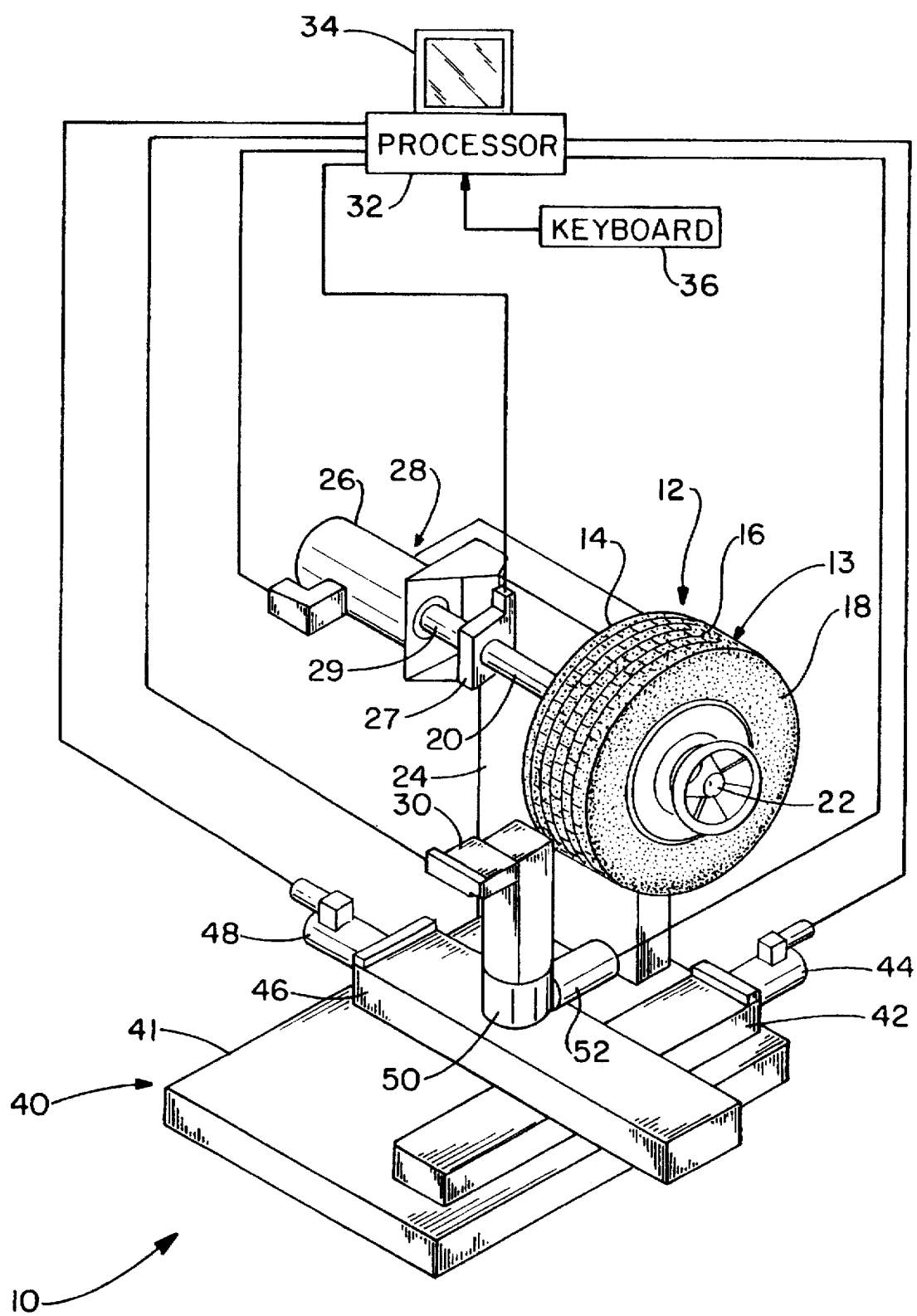
FIG. 1 is a schematic diagram of a tire profiler according to the invention.

Referring now to the drawings and more particularly to FIG. 1, it can be seen that an apparatus for obtaining tire profiles according to the present invention is designated generally by the numeral 10. As shown, a pneumatic tire 12, which has an outer surface 13 including an inner sidewall 14, a tread 16 and an outer sidewall 18, is mounted on a horizontal axle or shaft 20 and secured thereto by a hub 22. The axle 20 extends coaxially with the axis of rotation of the tire 12 such that the outer tread surface 16 generally forms a cylinder with the points thereof being equidistant from the axis of the axle 20, and the sidewalls form annular surfaces along each side of the tread so that the tread surface and sidewall surfaces form a toroid.

A support column 24 carries a motor 26 which is connected to and drives the axle 20 which is supported by a bearing 27, causing the tire 12 to rotate about its rotational axis. An encoder 28 is carried by the motor 26 and typically is connected to the motor shaft 29 at a location on the motor opposite bearing 27 for the purpose of monitoring the rotation and the positional location of selected points on the tire 12. Motor shaft 29 is coupled to axle 20 and runs axially through motor 26.

A non-contacting probe 30, such as a laser probe, is shown in juxtaposition to the tread 16. As will be described in detail hereinbelow, the non-contacting probe 30 is also positionable to be in juxtaposition with the inner sidewall 14 and the outer sidewall 18. As is well known, the laser probe 30 generates a source of laser light and includes a sensor for receiving the reflection of such light from a surface upon which it is impinged. The laser probe 30 determines from the reflected light the distance between the probe and the reflective surface. According to the instant invention, the sensor of the probe 30 receives light reflected back from the outer surface 13 and in particular from the surface from which the probe 30 is juxtapositioned. Other non-contacting probes, such as a sonic probe, could also be employed.

A processor 32 or other appropriate control unit provides the necessary hardware, software and memory for the implementation of algorithms and the storage of data necessary for the operation of the present invention. In particular, the processor 32 is connected to the non-contacting probe 30 for the purpose of retrieving measurement data and to the encoder 28 to obtain positional data of the axle 20. The processor 32 further controls the actuation of the motor 26 and receives the appropriate signals from the encoder 28 such that the exact position of the tire 12 is always known. The processor 32 correlates the position of the tire 12 with respect to the position of the non-contacting probe 30 to generate a two-dimensional profile of the tire. Connected to the processor 32 is a display screen 34 to provide visual information regarding the status of the apparatus 10. A keyboard 36 is also connected to the processor 32 to allow for information to be inputted by an operator of the apparatus 10. It will also be appreciated that the display screen 34 could include a touch-type screen which allows the direct input of information to the processor 32. As will be discussed in further detail hereinbelow, the input information provided can include such things as the approximate diameter of the tire, the nominal rim width, the actual rim width, the rim diameter and the nominal maximum section of the tire.

A linear-linear-rotary table 40 includes a base 41 which is connected to the end of the support column 24 opposite the motor 26. The table 40 includes a linear table 42 which is supported by the base 41 and operatively controlled by a servo motor 44. With the motor 44 connected to the processor 32, the linear table 42 is movable in a direction perpendicular to that of the axle 20. Mounted to the linear table 42 and movable therewith is a linear table 46. The linear table 46 is driven by a servo motor 48 which is connected to the processor 32. It will be appreciated that the directional movement of the linear table 46 is orthogonal or perpendicular to that of the movement of the linear table 42 and parallel to the axle 20. Mounted upon the linear table 46 is a rotary table 50 which is rotatably movable in a circular direction about an axis of rotation orthogonal to a plane which is parallel to the plane defined by the directions of movement of linear tables 42 and 46. Thus, if the direction of movement of linear table 42 defines an X-direction, and the direction of movement of linear table 46 defines a Y-direction perpendicular to the X-direction, then the axis of rotation of rotary table 50 is in a Z-direction orthogonal to the plane formed by the X and Y directions, and the rotation of the non-contacting probe about the axis is in a plane parallel to the plane formed by the X and Y directions. The rotary table 50 is driven by a servo motor 52 which is connected to the processor 32. The rotary table 50 carries the non-contacting probe 30 in juxtaposition to the outer surface 13. As such, the processor 32 can selectively position the linear table 42, the linear table 46 and the rotary table 50 to collect dimensional data from the tire 12. It will also be appreciated that the processor 32 is capable of determining the optimum distance that the non-contacting probe 30 should be positioned with respect to the tire 12 prior to the collection of data to obtain the most accurate readings possible.

Generally, the tire profiler apparatus 10 can be configured in various ways to obtain the desired measurement data of the tire 12. To obtain data, an operator physically mounts the tire 12 onto the axle 20 and secures the hub 22 thereto. Tire information is input into the processor 32 which then determines the necessary operating and control parameters. To operate, the apparatus 10 requires the following information as input: the approximate tire diameter, the approximate maximum section width and the rim diameter. This information is then employed by the processor 32 for the positioning of the non-contacting probe 30. Based upon this information, the processor 32 is able to determine the motion parameters for the operation of the linear-linear-rotary table 40. Upon entry of the tire size input information, the operator can then request the desired output information.

Figure 2:
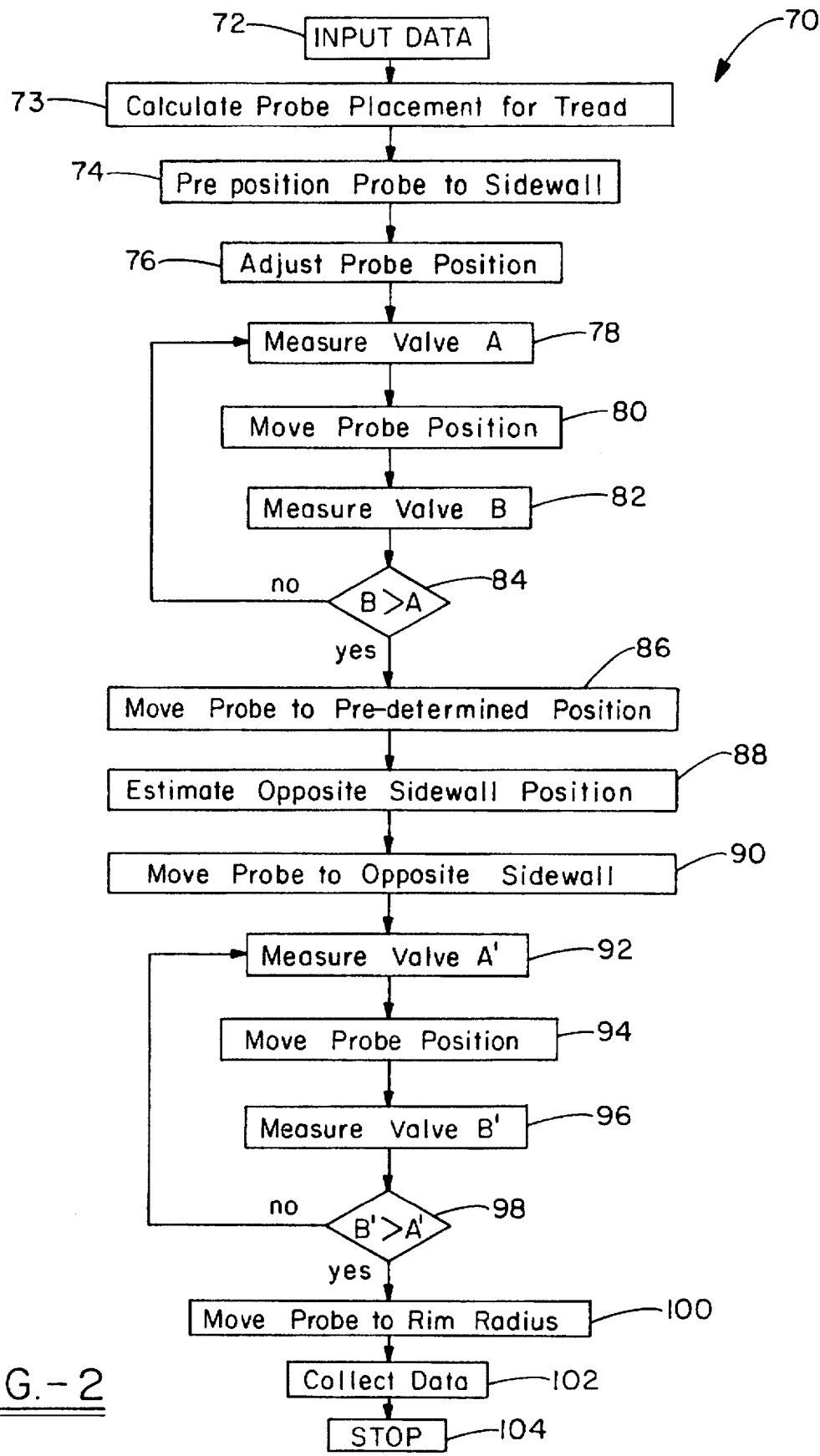
FIG. 2 is a flow chart diagram employed by the apparatus of FIG. 1 and comprising the method of automatically ranging a non-contacting probe into a position for taking measurements.

Referring now to FIG. 2, a method for automatically ranging the position of the non-contacting probe 30 is generally designated by the numeral 70. As those skilled in the art will appreciate, the processor 32 employs an algorithm to determine the optimum placement of the laser probe 30 with respect to the tire 12 for each of the three components of the outer surface 13. At step 72, the operator inputs, through either the keyboard 36 or the display screen 34, all the necessary input information regarding the tire and the format of the desired output. At step 73, the processor 32 calculates the probe 30 placement with respect to the tread 16. The processor 32 calculates this estimated starting position based on the approximate diameter of the tire 12 and the fixed standoff distance of the probe 30. Determining the probe placement for the sidewalls 14 and 18 is much more difficult because the tires are mounted on wheel assemblies which are not of a standard design. The wheel offset, which is the axial distance from the centerline of the wheel flange mounting surface where the tire bead mounts onto the wheel, is a non-standard dimension which varies from wheel design to wheel design. Thus, the distance from the wheel mounting plate, or mounting surface, to the maximum section width on the sidewall will vary and will initially be unknown for a particular test. The processor 32 is capable of determining this variable distance, which may well be out of the measurement range of the non-contacting probe. The processor 32 then adjusts the probe location so that the variable distance falls within the measurement range of the probe. This is a significant improvement because, while most measurements are made within the measurement range of the non-contacting probe, this arrangement adjusts the position of the non-contacting probe such that its location is optimal for obtaining data for a tire/wheel assembly not only for tread measurements but also for sidewall measurements. This results in a significant reduction in effort and more accuracy in correlating the sidewall measurements to the tread measurements.

To determine the optimum position of the probe 30 with respect to the sidewalls 14 and 18, the processor 32, at step 74, pre-positions the probe 30 at one extreme of its axial travel at a predetermined radial location. In particular, the probe 32 is positioned to a radial location, with respect to the axle 20, midway between the outer tire diameter and the rim diameter. This estimated starting position is usually the maximum section location of most tires. As such, this position is employed to determine the upper limit of the probe 30 measurement range. At step 76, the laser probe 30 is moved toward the tire 12 while the processor 32 monitors the output voltage of the probe. Once the output voltage reaches a pre-determined value, at step 78, the probe 30 is automatically stopped and an accurate laser measurement is made. This measurement value is stored as value A. At step 80, the probe 30 is moved inwardly a small distance to a confirmation position, typically about 0.06 inches, and another measurement is made which is stored as value B.

At step 84, the processor 32 compares value A to value B to determine whether value B is greater than value A. If value B is not greater than value A, the voltage reading taken by the laser probe 30 is out of the valid laser measurement range. As such, the processor 32 returns to step 78 to repeat steps 78–84. Once the processor determines at step 84 that the value B is greater than the value A (the expected result), the processor 32, at step 86, calculates how far to move the probe 30 so that it will read a predetermined specified value. This specified value, which is indicative of the optimum probe position and the lower limit of the probe measurement range is about 90 percent of the voltage output range. As such, a small measurement range is provided for any portion of the sidewall that may be closer to the probe 30 than the maximum section location of the tire. As those skilled in the art will appreciate, this optimum probe position is calculated in case there is a run-out of the tire maximum section width which would cause the tire to come closer to the probe 30 than originally predicted. Since the exact maximum section width location of the tire is only an approximate value, the actual tire maximum section may be located radially slightly away from the assumed location thereby causing the tire maximum section width to be closer to the probe 30 than originally calculated.

Once the inner sidewall probe position has been determined, at step 88, the processor 32 calculates the initial starting point for the outer sidewall probe position based on the approximate tire maximum section width, the laser standoff value and the calculated inner sidewall probe position. By calculating this estimated starting position, the probe 30 is positioned nearly at the correct position for the outer sidewall before the automatic laser ranging routine continues which, of course, reduces the amount of time required to properly range the probe 30. Accordingly, at step 90, the processor 32 instructs the linear-linear-rotary table 40 to move the probe 30 into its calculated position. At step 92, the probe 30 measures a value A'. At step 94, the processor 32 instructs the probe 30 to move inwardly to a confirmation position and at step 96 the probe measures a value B'. At step 98, the processor 30 compares the value B' to the value A'. If it is determined at step 98 that the value B' is not greater than the value A', the algorithm 70 returns the processor to step 92, to repeat steps 92–98. However, if it is determined that the value B' is greater than A', the processor 32 calculates the appropriate starting position of the probe 30 for the measurement of the outer sidewall 18.

With the starting positions of the probe 30 with respect to the inner sidewall 14, the tread 16 and the outer sidewall 18 calculated, the processor 32 moves the probe to the outer sidewall rim location at step 100. At step 102, the processor 32 sequences the movement of the table 40 and monitors the encoder 28 to collect the appropriate data in a process described hereinbelow. Finally, at step 104, after the collection of the required data, the operation of the apparatus 10 is stopped.

When collecting data, the processor 32 controls the actuation of motors 26, 44, 48 and 52 to coordinate the rotation of the tire 12 and the movement of the probe 30. In particular, the processor 32 causes the axle 20 to rotate at a constant fixed speed about the tire axis of rotation. The probe 30 is positioned by the table 40 such that the laser beam from the probe 30 falls upon the outer sidewall 18 at the rim location. Accordingly, the processor 32 increments the position of the probe 30 to collect data along the outer sidewall 18, the tread 16 and the inner sidewall 14. With the tire 12 rotating at a known speed, and the laser probe 30 operating at a set frequency, a predetermined number of data points are obtained from the outer surface 13. Accordingly, each such data point effectively corresponds to the distance of the data point from the central axis of the tire 12. The data points are thus indicative of the dimensional variation of the outer surface 13. The encoder 28 serves to monitor the speed of rotation of the tire about its axis of rotation. Of course, each of the data points obtained from each revolution of the tire 12 are a function of the rotational speed of the tire and the frequency of operation of the laser probe 30. Once this data has been obtained, the processor 32 employs a data filtering/averaging algorithm for each of the circumferential scan locations and condenses it into one "average" value. This allows an average cross-sectional profile of the tire to be generated where tread cross-slots, pin vents and sidewall lettering are filtered out.

For each circumferential scan location, data from a specified number of points is collected, usually between 1000 and 4096, and these data points are partitioned into a specified number of subsets. For example, if 1000 data points were taken, the first 40 data points make up the first subset, data points 41 through 80 make up the second subset, and so on. Each subset is then ordered from the lowest value to the highest value. Each reordered subset then has a specified percentage of the highest and lowest valued data points removed. Removing a specified percentage of the highest valued data points eliminates much of the noise in the data along with any locally measured phenomena such as pin vents and unwanted debris which are not representative of the tire profile. Removing the specified percentage of the lowest value data points eliminates the undesired cross-slot data which is not typically included in the three-dimensional profile measurement. Once this filtering is complete, the remaining data and all of the subsets are averaged and condensed down to one value. As those skilled in the art will appreciate, partitioning each circumferential data set removes the effect of large tire run-outs on the data filtering. In other words, if the entire data set, which presumably contains significant run-out in the measurement, were filtered and averaged, this run-out may dominate over the measurement noise. In this case, the highest and lowest value data points which would get filtered out may actually be good data points while some of the data points which were not eliminated may contain a significant amount of noise. As such, the filtering/averaging technique employed by the apparatus 10 ensures the quality of the average value of the three-dimensional profile. Of course, the apparatus 10 may employ other data filtering/averaging techniques to obtain a proper tire profile.

Referring now to FIG. 3, a method for generating an average cross-sectional tire profile from the measurements of the inner sidewall 14, the tread 16 and the outer sidewall 18 is generally designated by the numeral 110. This method 110 includes the automated ranging feature previously described and is designated as step 70 in FIG. 3. Upon completion of the auto ranging step, the operator, through the processor 32, begins rotation of the tire 12 at step 120. Once the tire has reached a constant and fixed speed, as monitored by the encoder 28, the processor 32 positions the probe 30 in juxtaposition to a sidewall near the rim of the tire and begins taking measurements at step 122.

In the preferred embodiment, the data acquisition system of the processor 32 collects data from about 1000 data points around the circumference of the tire. The processor 32 correlates the meridial position of the tire with the position of the non-contacting probe 30 to generate an average circumferential measurement of the tire at a given meridial position. This data point is then plotted on the display monitor 34 to provide the operator with visual feedback as the profile is measured to ensure that the data is "good." Upon completion of this portion of the data, the probe 30 is then moved to the next meridial location and data from the next data point is collected. Typically, the probe 30 is moved in about 0.100 inch increments around the meridian of the tire. Those skilled in the art will appreciate that the operator has the ability to change the probe increments or scan spacing when not operating in a standard test mode to obtain the desired number of data points. As discussed previously, these data points are employed to derive values for tire diameter, maximum section width, maximum section width standard deviation and tire diameter standard deviation. Of course, other parameters can be calculated.

Upon completion of the measurement of one sidewall at step 122, the collected data is filtered and stored at step 123. Next, the probe 30 is repositioned by the processor 32 to measure the tread 16 at step 124. In much the same manner as the measurements undertaken at step 122, the processor 32 collects data measurements along the surface of the tread 16. Upon completion of step 124, the collected data is filtered and stored at step 125. Next, the probe 30 is repositioned and measures the opposite sidewall surface at step 126, whereupon the collected data is filtered and stored at step 127. At step 128, the processor 32 removes any overlapping data that occurs during movement of the probe 30 between the sidewalls and the tread. At step 130, the processor 32 plots the collected data to present an average cross-sectional tire profile by using the average circumferential measurements determined at each meridial position. Upon completion of the collection of data, the processor 32, at step 132, returns the probe 30 to its starting position so that the tire may be dismounted and the apparatus 10 readied for another test.

As can be seen from the structure and methodology presented above, the average cross-sectional tire profile generated by the apparatus 10 presents numerous advantages not found in currently known measuring systems. Primarily, the apparatus 10 allows for the efficient measurement of the entire outer surface of a tire without the constant manual manipulation of the measuring device to obtain the optimum measuring location. Additionally, the apparatus 10 provides a complete average profile of the entire outer surface of the tire. In the past, separate measurement cycles were required to measure the inner sidewall, the tread and the outer sidewall, thus requiring additional testing time and the possibility of inconsistent measurements between the three sections of the outer surface.

Referring now to FIG. 4, a method for generating a high definition, two-dimensional cross-sectional profile of the outer surface of a tire 12 is generally designated by the numeral 140. The method 140, employs the auto-ranging algorithm indicated by the numeral 70 as described hereinabove. Generally, the high definition measurement presented by the method 140 differs from an average tire profile scan in three ways. First, when collecting an average profile, data is collected while the tire is spinning, whereas for a high definition cross-sectional profile, the tire is stationary while data is being acquired. Second, the meridial scan increment for an average profile is approximately 0.1 inches compared to 0.005 inches for a high definition cross-sectional profile. Finally, when collecting data for an average profile, up to 10,000 data points are collected and averaged for each incremental meridial step, whereas only one data point is collected for each incremental meridial step of a high definition cross-sectional profile.

After the auto-ranging step 70, the probe 30 is positioned to the centerline of the tread 16. Once at the tread centerline, the laser probe 30 is turned on and provides a laser location spot. At step 152, the operator positions or orients the tire to the desired location he or she wishes to scan. Although one scan is sufficient to obtain a high definition profile, it will be appreciated that any number scans for a single tire could be obtained. Then, at step 154, the apparatus 10 turns the laser off and repositions the probe 30 to one of the tire sidewalls. At step 156, the probe 30 is moved along the sidewall starting at the rim and stopping just short of the tire outer diameter to take measurements therealong. The processor 32 obtains measurement values by correlating the meridial position of the tire 12 with the position of the non-contacting probe to generate a single measurement of the tire at a given meridial and circumferential position. At step 158, the processor 32 repositions the probe 30 and takes measurements along the tread 16. At step 160, the processor 32 repositions the probe 30 to measure the opposite sidewall and collect data therealong. At step 162, the processor 32 removes any overlapping data in the transitional areas between the sidewalls and the tread. The processor 32 generates the high definition cross-sectional profile by assembling the individual measurements determined at each meridial and circumferential position. At step 164, when the data collection is complete, the data is filtered and then stored. The assembled profile can then be displayed on screen 34 or reproduced in an alternate tangible medium, such as by plotting. Finally, at step 166 the laser is turned off and returned to the initial starting position and the system is ready to begin another testing sequence.

The high definition two-dimensional cross-sectional profile generated by the apparatus 10 presents numerous advantages not found in currently known measuring systems. As discussed previously, the apparatus 10 provides a method for automatically positioning the probe 30 without the manual manipulation thereof. Additionally, by incrementing the position of the probe about every 0.005" around the meridian of the tire, a high definition representation is generated that shows significant detail of the tire that was previously unavailable.

Thus it can be seen that the objects of the invention have been satisfied by the structure and methodology presented above. The apparatus 10 can be employed to generate an average cross-sectional tire profile or a high definition cross-sectional tire profile at any desired location along the circumference of the tire. By virtue of the linear-linear-rotary table 40 carrying the probe 30, it will be appreciated that any position along the tire can be measured with either the tire held stationary or rotated at a desired speed. Additionally, the apparatus may be employed to scan specific areas of a tire. It will also be appreciated that the data collected can be stored and compared with other tires for quality control analysis.

While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. An apparatus for obtaining a profile of a tire outer surface that includes a tread and opposed sidewalls, comprising:

means for determining the rotational position of a tire about a tire axis of rotation, the tire having an outer surface;

means for moving a single non-contacting probe in juxtaposition to the outer surface of the tire, wherein said moving means repositions said non-contacting probe along one sidewall, then along the tread, and then along to the other sidewall without interruption while said non-contacting probe collects dimensional data of the tire outer surface; and means for processing data retrieved by said non-contacting probe and said determining means, said processing means correlating the rotational position of the tire with the position of the non-contacting probe to generate a profile of the outer surface.

2. The apparatus according to claim 1, wherein said processing means selectively positions said non-contacting probe within an optimum measurement range of the tire outer surface prior to the collection of dimensional data to optimize the data collected by said non-contacting probe.

3. The apparatus according to claim 2, wherein said moving means comprises:

a first linear table movable in a first direction;

a second linear table movable in relation to said first linear table in a second direction orthogonal to said first direction; and a rotary table movable in relation to said second linear table in a circular direction about an axis perpendicular to a plane formed by said first direction and said second direction, said rotary table carrying said non-contacting probe.

4. The apparatus according to claim 3, further comprising:

a support column extending from a base that supports said first linear table; and an axle carried by said support column, said axle rotatably carrying the tire, wherein said determining means monitors the rotational position of said axle.

5. The apparatus according to claim 4, wherein said axle is rotated at a speed monitored by said processing means while said non-contacting probe measures uninterrupted the outer surface of the tire to generate an average cross-sectional profile of the tire, said outer surface including an inner sidewall, a tread and an outer sidewall.

6. The apparatus according to claim 4, wherein said axle is maintained in a fixed position while said non-contacting probe measures uninterrupted a pre-selected portion of the outer surface of the tire to generate a high definition cross-sectional profile of the tire, said outer surface including an inner sidewall, a tread and an outer sidewall.

7. A method for obtaining a profile of various sized tires each having a tread and adjacent sidewalls, comprising the steps of:

mounting a tire upon an axle, the tire having a tread and adjacent sidewalls;

positioning a non-contacting probe in juxtaposition to at least the adjacent sidewalls;

ranging said non-contacting probe to optimize measurement of at least the adjacent sidewalls, wherein said step of ranging is adaptable to measure various sized tires having various sized section widths along the lengths of the sidewalls, and wherein said step of ranging determines a position of said non-contacting probe so that the adjacent sidewalls can be measured within a measurement range of the non-contacting probe; and measuring the outer surface of the tire with said non-contacting probe utilizing the positions determined by said ranging step to generate a plurality of data points which correlate to a profile of the outer surface which includes the tread and at least one sidewall.

8. The method according to claim 7, wherein the step of positioning comprises the steps of:

moving a first linear table in a first direction;

moving a second linear table in a second direction orthogonal to said first direction;

moving a rotary table in a circular direction about an axis perpendicular to a plane defined by said first direction and said second direction, wherein said rotary table carries said non-contacting probe.

9. The method according to claim 8, wherein the step of ranging comprises the steps of:

a) inputting tire size data;

b) moving said non-contacting probe to an estimated starting position;

c) measuring a first dimensional value;

d) moving said non-contacting probe to a confirmation position;

e) measuring a second dimensional value;

f) comparing said first dimensional value to said second dimensional value to confirm an expected result and repeating steps b) through e) until said expected result is obtained; and g) moving said non-contacting probe to read a predetermined specified value based upon said expected value that correlates to an optimum position for measuring the outer surface of the tire.

10. The method according to claim 8, wherein the tire has an inner sidewall, a tread and an outer sidewall, and wherein the step of ranging includes:

a) inputting tire size data;

b) moving said non-contacting probe to a starting position in juxtaposition to the inner sidewall;

c) determining an optimum position of said non-contacting probe with respect to the inner sidewall;

d) calculating a starting position for said non-contacting probe in juxtaposition to the outer sidewall based upon said optimum position of said non-contacting probe for said inner sidewall; and e) determining an optimum position of said non-contacting probe with respect to the outer sidewall.

11. The method according to claim 10, wherein the steps of determining an optimum position comprises the steps of:

a) moving said non-contacting probe to an estimated starting position;

b) measuring a first dimensional value;

c) moving said non-contacting probe to a confirmation position;

d) measuring a second dimensional value;

e) comparing said first dimensional value to said second dimensional value to confirm an expected result and repeating steps a) through d) until said expected result is obtained; and f) moving said non-contacting probe to read a specified value based upon said expected value that correlates to an optimum position for measuring the outer surface of the tire.

12. The method according to claim 8, wherein the tire has an inner sidewall, a tread and an outer sidewall and wherein the step of measuring the outer surface further comprises the steps of:

rotating the tire about its axis of rotation;

incrementing the position of said non-contacting probe to measure the outer sidewall;

incrementing the position of said non-contacting probe to measure the tread;

incrementing the position of said non-contacting probe to measure the inner sidewall; and generating an average cross-sectional tire profile from the measurements of the inner sidewall, the tread and the outer sidewall.

13. The method according to claim 8, wherein the tire has an inner sidewall, a tread, and an outer sidewall and wherein the step of measuring further comprises the steps of:

holding the tire about its axis of rotation;

incrementing the position of said non-contacting probe to measure the outer sidewall;

incrementing the position of said non-contacting probe to measure the tread;

incrementing the position of said non-contacting probe to measure the inner sidewall; and generating a high definition cross-sectional tire profile from the measurements of the inner sidewall, the tread and the outer sidewall.

14. An apparatus for generating a tire profile, comprising:

a first linear table movable in a first direction;

a second linear table movable in relation to said first linear table in a second direction orthogonal to said first direction;

a rotary table movable in relation to said second linear table in a third direction rotatable in the plane of said first and second directions;

a support column extending from a base that supports said first linear table, said support column rotatably supporting an axle on which a tire is mounted, the tire having an inner sidewall, a tread and an outer sidewall;

a non-contacting probe carried by said rotary table, said non-contacting probe measuring the inner sidewall, in a continuous uninterrupted motion the tread and the outer sidewall;

an encoder connected to and monitoring the rotation of said axle; and a processor connected to said encoder and said non-contacting probe to control the positioning of said non-contacting probe, and to collect measurements of said non-contacting probe with respect to the rotational position of the tire as monitored by said encoder, said measurements being employed to generate a tire profile.

15. The apparatus according to claim 14, wherein said non-contacting probe is a laser probe and wherein said processor positions said laser probe by controlling the movement of said first linear table, said second linear table and said rotary table prior to the collection of the measurements to optimize the measurement process.

16. The apparatus according to claim 15, wherein said laser probe collects measurement data in about 0.100 inch increments while the tire is rotated about its axis to generate an average cross-sectional tire profile.

17. The apparatus according to claim 15, wherein said laser probe collects measurement data in about 0.005 inch increments while the tire is fixed about its axis to generate a high definition cross-sectional tire profile.

* * * * *